UNITED STATES PATENT OFFICE.

EDMUND P. POTTER AND WILLIAM H. HIGGIN, OF BOLTON, COUNTY OF LANCASTER, ENGLAND.

MANUFACTURE OF BICHROMATE OF SODA.

SPECIFICATION forming part of Letters Patent No. 279,431, dated June 12, 1883.

Application filed February 24, 1883. (No specimens.)

*To all whom it may concern:*

Be it known that we, EDMUND PEEL POTTER and WILLIAM HENRY HIGGIN, both of Bolton, in the county of Lancaster, England, have invented certain new and useful Improvements in the Manufacture of Bichromate of Soda, of which the following is a specification.

Potassium bichromate is in very large demand as an oxidizing agent. Sodium bichromate is much superior in this respect; but hitherto all attempts to isolate it from other salts have proved but partially successful. We have, however, succeeded in separating it by the following process:

We furnace sulphate of soda, or other sodium salts, chrome ore, and lime, or carbonate of lime, in certain proportions in the same furnaces and in the same manner in which sulphate of potash, chrome ore, and lime are now furnaced in bichromate-of-potash manufacture. As there is nothing new in this part of the process other than using an equivalent quantity of sulphate of soda for the sulphate of potash hitherto used, there is no need in further describing this part of the process, which can be found in any text-book. When chemical action has ceased the materials, largely monochromate of soda and sulphate or other salt of lime, are withdrawn from the furnace and lixiviated. The monochromate-of-soda solution formed in this operation is treated with hydrochloric acid in exactly sufficient quantity to change the chromate into a bichromate. Now, in the manufacture of bichromate of potash sulphuric acid is used, and we believe it is this use of sulphuric acid instead of hydrochloric acid that has prevented any one hitherto from obtaining bichromate of soda in a separate form. Sulphate of soda in crystallizing takes up a quantity of water, and as the water contains bichromate of soda it absorbs this salt along with it, and the two cannot be separated. When hydrochloric acid is used chloride of sodium is formed, and this salt is anhydrous, so does not take up the bichromate of soda when crystallizing. The liquid, after treatment with acid, contains bichromate of soda, cloride of sodium, and a little sulphate of soda in solution. The latter can usually be neglected; but if very pure samples of bichromate be required with little waste it may in some cases be desirable to separate the sulphuric acid, and by precipitation with chloride of calcium or barium. The mixed solution of bichromate of soda and chloride of sodium is now concentrated in any suitable evaporating vessel or tank, the crystals of chloride of sodium being fished out as they form. When the material has come to a pasty consistency it is withdrawn and dried at a heat not much exceeding the ordinary boiling-point of water, and is then nearly pure bichromate of soda. The crystals of chloride of sodium, coated as they are with bichromate of soda, would be of little value themselves and entail great loss of bichromate. They are therefore well washed in liquor poor in bichromate of soda, but rich in chloride of sodium, such as prepared vat-liquor. The liquor takes up the bichromate, but dissolves very little of the chloride. Two or more of the successive washings, first with the rich liquor, then with poorer, can be made, if desired. The liquor when too rich in bichromate to act as a wash can be added to the fresh liquor in the concentrating-pans. The bichromate of soda is a far more powerful oxidizer and contains more oxygen, bulk for bulk, than bichromate of potash, so will doubtless soon come into large industrial use, the little chloride of sodium with which it is contaminated being perfectly neutral and innocuous.

We recover the chromium and sodium salts contained in the washed fished salts by decomposing with sulphuric acid in an ordinary salt-cake furnace, and using the resulting compound for decomposing chrome ore in place of an equivalent quantity of sodium sulphate. In the above process it will be seen what an important step the treatment with hydrochloric acid becomes. It would, however, be possible to use sulphuric acid, as in the case of bichromate-of-potash manufacture, and then by means of double decomposition with chloride of calcium, strontium, or barium, convert the sulphate of soda present into chloride of sodium; but that would be a roundabout and wasteful variation of our process. We have also succeeded in isolating sodium bichromate by treating the above liquors with sulphuric acid in place of hydrochloric acid; but we find that the former is not so advantageous, for reasons before stated, as the latter. In this variation of the process the sulphate-of-soda salts are fished out and used, after being dried, for the furnacing operation already described, in lieu of fresh sulphate of soda.

We are aware that the potassium chromate has been obtained by fusing the chrome ore with carbonate of lime and sulphate of potash, lixiviation, concentration, and the addition of sulphuric acid. Such a process is described in English Patent No. 1,115 of 1882, to Charles Denton Able.

We claim as our invention—

1. The improvement in the process of manufacturing bichromate of soda, which consists in adding an equivalent quantity of sulphate of soda to the chrome ore, furnacing the mass, lixiviating it, treating with hydrochloric acid, separating the sodic sulphate present by precipitating with calcic or baric chloride, concentrating the solution by evaporation in suitable vessels to a pasty mass, removing the crystals of sodic chloride formed, washing them and adding the resulting liquor to the original mass, and finally drying the mass at a temperature a little above that of boiling water, substantially as hereinbefore set forth.

2. The improvement in the process of manufacturing bichromate of soda, which consists in treating the monochromate-of-soda solution with hydrochloric acid, substantially as hereinbefore set forth.

3. The improvement in the process of manufacturing bichromate of soda, which consists in treating a solution containing bichromate of soda and sulphate of soda with chloride of calcium, strontium, or barium in sufficient quantities to change the sulphate in solution into a chloride, substantially as hereinbefore set forth.

4. The improvement in the process of manufacturing bichromate of soda, which consists in adding an equivalent quantity of sulphate of soda to the chrome ore for the purpose of forming an anhydrous salt with the acid subsequently employed, lixiviating the furnaced mass, and treating with hydrochloric acid, substantially as hereinbefore set forth.

5. The improvement in the process of manufacturing bichromate of soda, which consists in treating the monochromate-of-soda solution with sulphuric acid and converting the sodic sulphate thus formed into chloride by the addition of chloride of calcium, strontium, or barium, concentrating the solution, removing the crystals of sodium chloride, and finally drying at a temperature a little above that of boiling water, substantially as hereinbefore set forth.

6. The improvement in the process of manufacturing bichromate of soda, which consists in concentrating the mixed solution of bichromate and sodic chloride by evaporation in suitable vessels to a pasty consistency, removing the sodium-chloride crystals as they form, washing these crystals thus obtained in a weak bichromate solution to remove the bichromate adhering to them, adding the washings to the original mass, concentrating this solution, and finally drying the pasty mass formed by the concentration at a temperature a little above that of boiling water, substantially as hereinbefore set forth.

7. The improvement in the process of manufacturing bichromate of soda, which consists in removing the sodic sulphate present in the hydrochloric-acid solution of the chrome ore and sulphate of soda by decomposing it with calcic or baric chloride, and removing the products of this decomposition, substantially as hereinbefore set forth.

8. The improvement in the process of manufacturing bichromate of soda, which consists in treating the crystals of impure chloride of sodium which have been extracted from the bichromate solution and washed by decomposing them with sulphuric acid in a salt-cake furnace and applying the product to the decomposition of the chrome ore, as above described, in place of sodium sulphate, substantially as hereinbefore set forth.

EDMUND P. POTTER.
W. H. HIGGIN.

Witnesses:
I. GAHAN,
JOHN WOOD,
    *Both of Manchester.*